(12) United States Patent
Miyata et al.

(10) Patent No.: US 7,573,903 B2
(45) Date of Patent: Aug. 11, 2009

(54) IPV6/IPV4 TRANSLATOR

(75) Inventors: Hiroshi Miyata, Musashino (JP); Masahito Endo, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 623 days.

(21) Appl. No.: 11/033,836

(22) Filed: Jan. 13, 2005

(65) Prior Publication Data

US 2006/0153230 A1 Jul. 13, 2006

(51) Int. Cl.
*H04J 3/24* (2006.01)
(52) U.S. Cl. .................... 370/466; 370/395.54; 370/475
(58) Field of Classification Search ................. 370/466, 370/475, 395.54
See application file for complete search history.

(56) References Cited

U.S. PATENT DOCUMENTS

| | | | |
|---|---|---|---|
| 6,182,141 B1 * | 1/2001 | Blum et al. ................. | 709/227 |
| 6,480,508 B1 * | 11/2002 | Mwikalo et al. ............ | 370/475 |
| 2002/0120782 A1 * | 8/2002 | Dillon et al. ................. | 709/246 |
| 2003/0014541 A1 * | 1/2003 | Poeluev ...................... | 709/245 |
| 2003/0172183 A1 * | 9/2003 | Anderson et al. ........... | 709/245 |
| 2003/0225912 A1 * | 12/2003 | Takeda et al. ............... | 709/246 |
| 2004/0095962 A1 * | 5/2004 | Ohta ........................... | 370/475 |
| 2004/0233916 A1 * | 11/2004 | Takeuchi et al. ....... | 370/395.54 |
| 2005/0198386 A1 * | 9/2005 | Accapadi et al. ............ | 709/245 |
| 2006/0153230 A1 * | 7/2006 | Miyata et al. ............... | 370/466 |

FOREIGN PATENT DOCUMENTS

JP 2000-115234 4/2000

* cited by examiner

*Primary Examiner*—Ricky Ngo
*Assistant Examiner*—Ben H Liu
(74) *Attorney, Agent, or Firm*—Westerman, Hattori, Daniels & Adrian, LLP.

(57) ABSTRACT

A client to utilize a translator without changing the DNS server specification, when a service targeted at general clients is provided. An IPv6/IPv4 translator which reciprocally translates packets between IPv6 and IPv4 protocols and is configured so that a DNS query from a client reaches a translator DNS proxy using a dedicated domain effective as a specific DNS domain, the translator DNS proxy specifying an operation by entering a defined character string in FQDN.

4 Claims, 11 Drawing Sheets

IPV6/IPV4 TRANSLATOR

BACKGROUND OF THE INVENTION

1. Field of the Invention

The present invention relates to an IPv6/IPv4 translator, and more precisely, to automatic address generation.

2. Description of the Related Art

A description on header part translation between IPv6 and IPv4 protocols is found in paragraph 0049 of Patent Document 1.

However, Patent Document 1 describes a packet processor, a packet processing method and a packet exchanger, aiming at implementing memory saving as well as realizing smooth pipeline processing in which there is no competition in accessing a shared memory between processing in different layers.

Contrary to the above, the present invention allows automatic address generation without changing address settings for a Domain Name System (hereafter abbreviated as DNS) server and thus its objective is different from that of Patent Document 1.

[Patent Document 1]
Japanese Laid-open Patent Application No. 2000-115234
The method which an IPv6/IPv4 translator uses in order to provide the user with a user-friendly environment is the technique whereby a DNS server translates addresses as a method for dynamically generating addresses. Concretely, this is achieved by sending a query packet in a DNS to specific equipment having a DNS proxy function from a client. This means that an automatic address generation service is provided for a specified client.

In general, to send a DNS query to a specific DNS proxy, it is necessary for a client to set up the address as a DNS server to the relevant DNS proxy.

However, since this setup change cannot be expected for an unspecified client, a structure, in which an IPv6/IPv4 translator can be utilized without implementing such a setup change, becomes necessary.

The present invention provides a structure in which an IPv6/IPv4 translator can be used without necessitating the client to change the setup for a DNS server.

Figure 1:
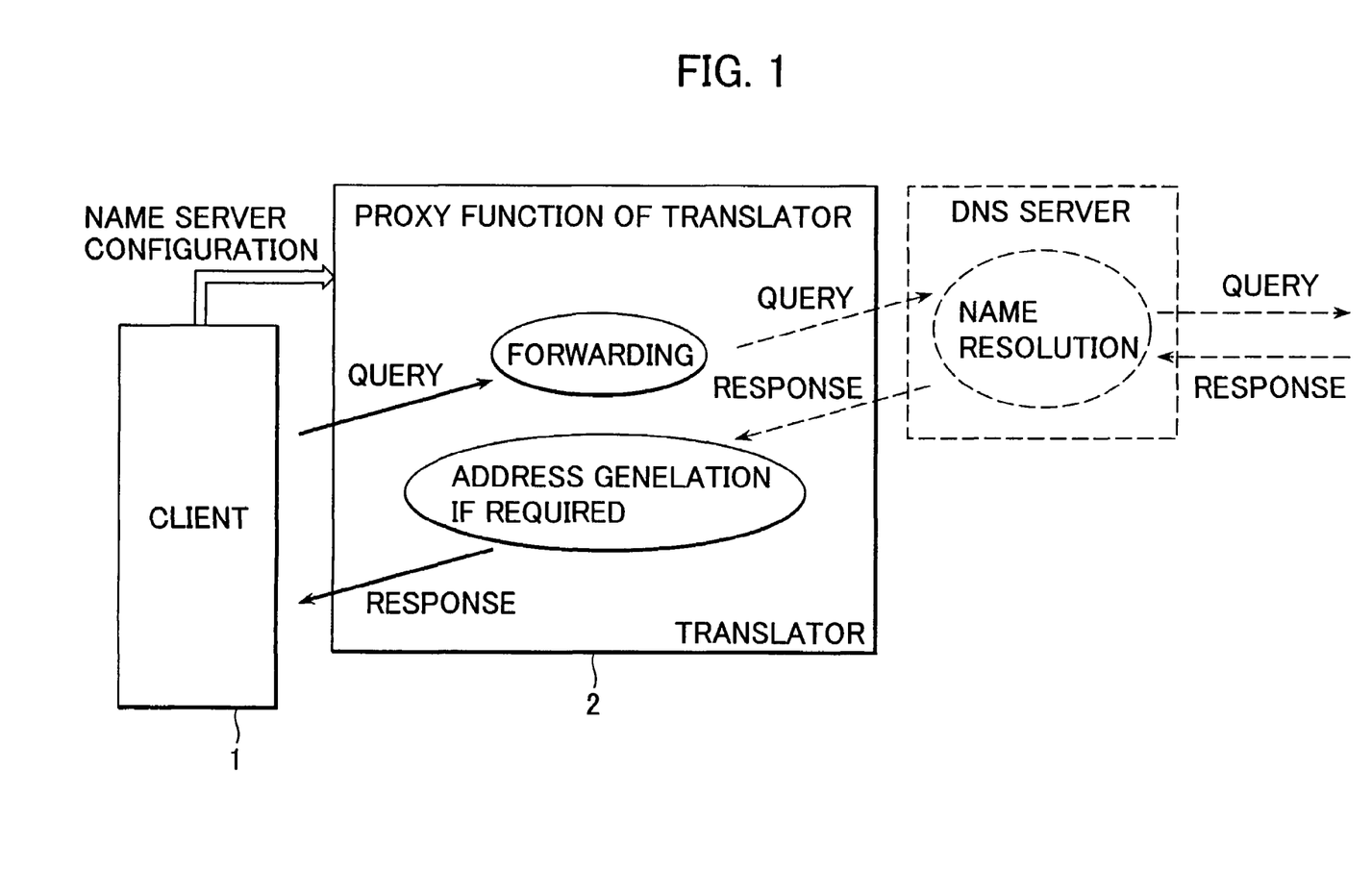
FIG. 1 is a block diagram if the DNS proxy function of a translator is used as a DNS server by a client.

FIG. 1 is a block diagram in the case where a client utilizes the DNS proxy function of a translator as the DNS server. In FIG. 1, it is necessary to specify the DNS proxy in translator 2 as the DNS server for client 1 to utilize automatic address generation by DNS. The DNS proxy in translator 2 returns an appropriate address, determined by the types of the address obtained and types of the address queried and setup contents, to client 1.

Figure 2:
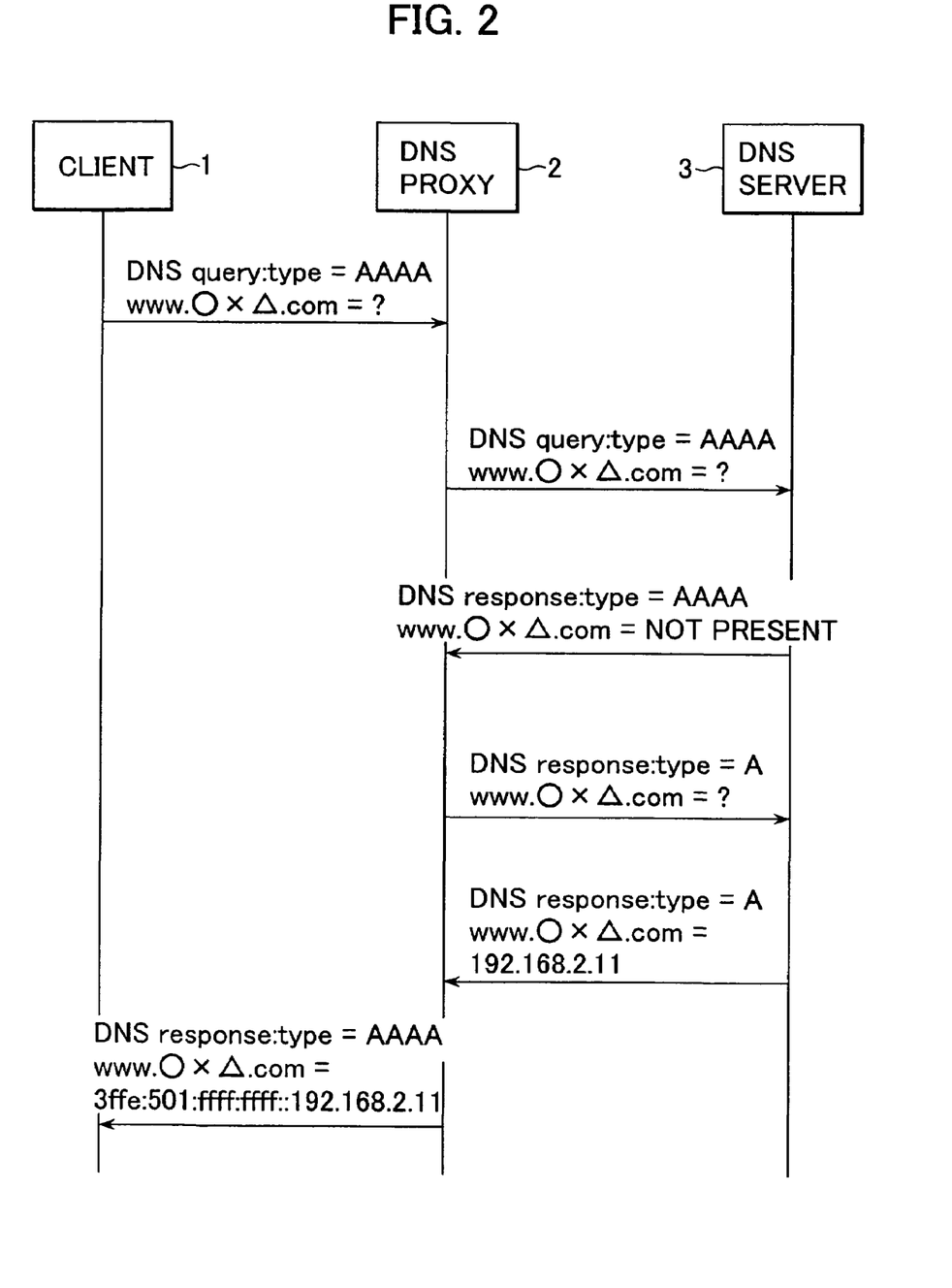
FIG. 2 is an illustrative drawing showing an example of operation when a client queries an IPv6 address.

FIG. 2 is an illustrative drawing of the operation when a client queries an IPv6 address and shows an example in which the IPv6 address is automatically generated.

(1) Client 1 requests DNS proxy 2 to reply the IPv6 address for "www.oxΔ.com" ("AAAA" record).

(2) DNS proxy 2 forwards the request from client 1 to DNS server 3.

(3) DNS server 3 queries the IPv6 address corresponding to "www.oxΔ.com" to other name servers not shown in the drawing. However, DNS server 3 obtains the response that no corresponding IPv6 address is present. (If the corresponding IPv6 address is present at that time, DNS proxy 2 returns the received IPv6 address to client 1.)

(4) DNS proxy 2 requests DNS server 3 to reply the IPv4 address ("A" record) corresponding to "www.oxΔ.com".

(5) DNS server 3 queries the IPv4 address corresponding to "www.oxΔ.com" to other name servers not shown in the drawing and obtains the corresponding IPv4 address and notifies DNS proxy 2 of that address.

(6) DNS proxy 2 generates an address using a Dummy Prefix prepared for mapping the IPv4 address to an IPv6 address and returns it to client 1 as an IPv6 address.

Figure 3:
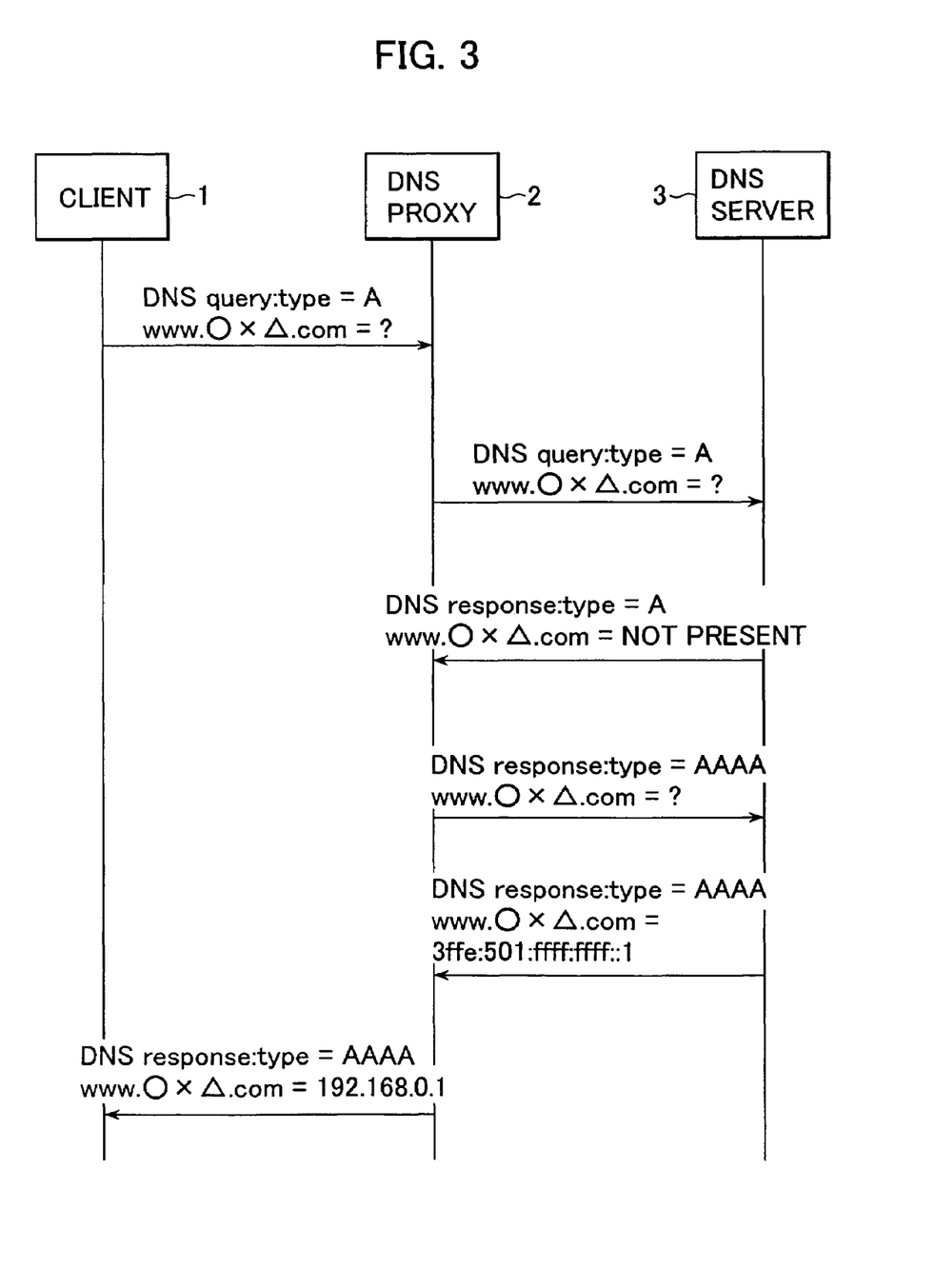
FIG. 3 is an illustrative drawing showing an example of operation when a client queries an IPv4 address.

FIG. 3 is an illustrative drawing showing the operation when a client queries an IPv4 address and shows an example in which an IPv4 address is automatically generated.

(1) Client 1 requests DNS proxy 2 to reply the IPv4 address for "www.oxΔ.com" ("A" record).

(2) DNS proxy 2 forwards the request from client 1 to DNS server 3.

(3) DNS server 3 queries the IPv4 address corresponding to "www.oxΔ.com" to other name servers not shown in the drawing. However, DNS server 3 obtains the response that no corresponding IPv4 address is present. (If the corresponding IPv4 address is present at that time, DNS proxy 2 returns the received IPv4 address to client 1.)

(4) DNS proxy 2 requests DNS server 3 to reply the IPv6 address ("AAAA" record) corresponding to "www.oxΔ.com".

(5) DNS server 3 queries the IPv6 address corresponding to "www.oxΔ.com" to other name servers not shown in the drawing and obtains the corresponding IPv6 address and notifies DNS proxy 2 of that address.

(6) DNS proxy 2 allocates the IPv4 address prepared for mapping the IPv6 address to the IPv4 address to this IPv6 address and returns it to client 1 as an IPv4 address.

There is absolutely no problem with these conventional usages as long as the environment is such that a client can specify the DNS proxy of a translator as a DNS server. However, such a setup change cannot be expected when services are provided for unspecified general clients.

SUMMARY OF THE INVENTION

The present invention is intended to solve the aforementioned problems and the objective of the present invention is to achieve a structure that enables a translator to be used without changing the specification of a DNS server in a client when providing services targeting general clients.

Accordingly, the present invention is characterized by having an IPv6/IPv4 translator which conducts reciprocal translation of packets between IPv6 and IPv4 protocols and is configured so that a DNS query from a client reaches the translator DNS proxy using a dedicated domain effective as a specific DNS domain, and the above translator DNS proxy can be specified an operation by entering a defined character string in the Fully Qualified Domain Name (hereafter abbreviated as FQDN).

In addition, the present invention is characterized by the above client specifying at least either the IPv6 address base or the IPv4 address base in FQDN as a desired address, and also by the client specifying at least either the translated address or the un-translated address as a response address.

According to the present invention, communications via a translator can be used if necessary without changing the DNS server specification at a client terminal, and the user can make communications via a translator if necessary by specifying an explicit destination address.

In addition, since it becomes unnecessary to specify a translator, even a general unspecified client can utilize communications via a translator.

Further, the user can specify the address translation policy for the translator DNS proxy.

DESCRIPTION OF THE PREFERRED EMBODIMENTS

The present invention is described below in detail referring to the drawings. In the present invention, a domain is prepared so that DNS queries reach the DNS proxy of a translator. Although "6×4.org" is assumed as a domain name in the description below, this is not used in actuality as an effective domain name or host name in other places. Any domain is acceptable as far as it is a domain which can specify the DNA proxy of the translator as a name server having that domain name. The DNS proxy of the translator is registered as the name server for "6×4.org".

Figure 4:
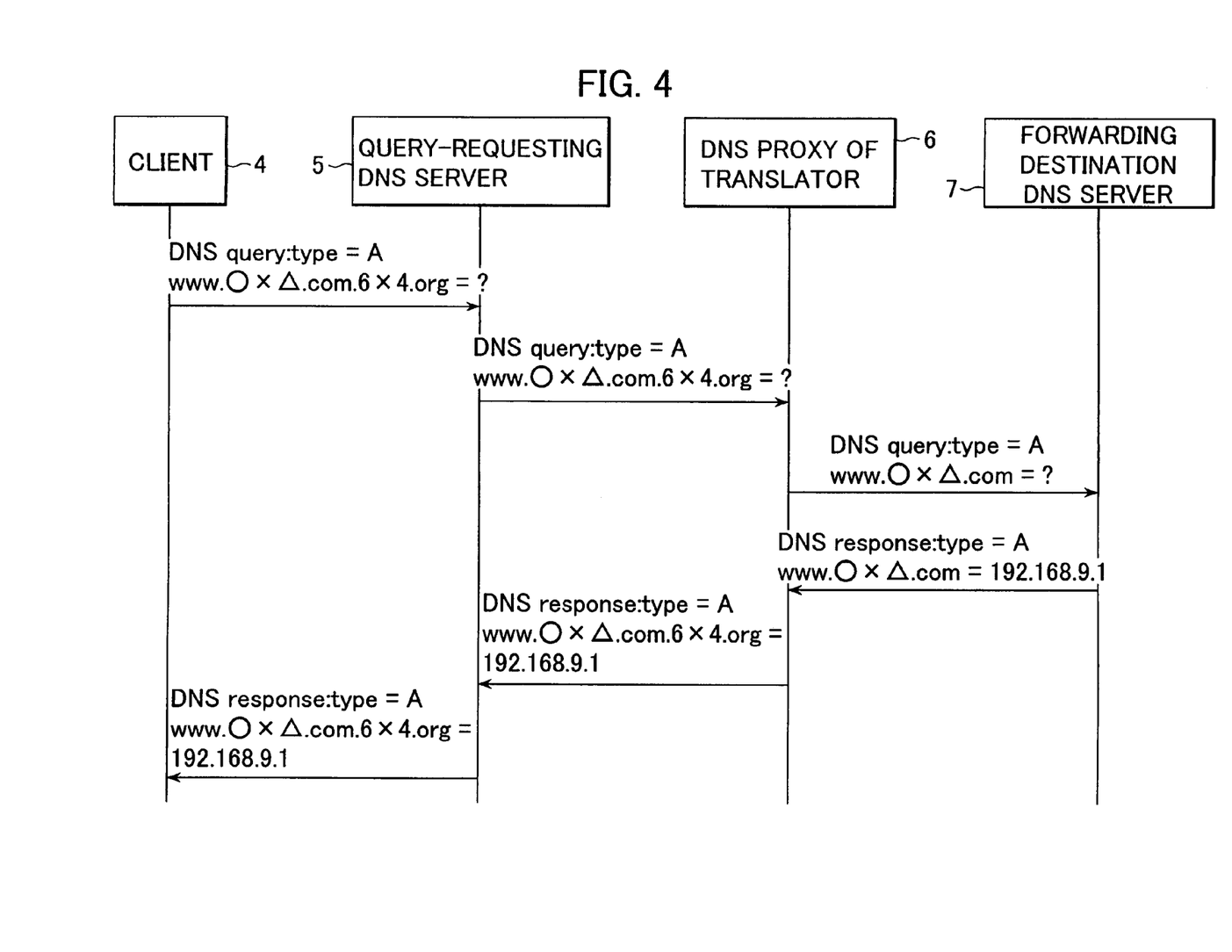
FIG. 4 is an illustrative drawing showing an example of operation in an embodiment of the present invention.

FIG. 4 is an illustrative drawing showing an example of operation in an embodiment of the present invention and shows the operation if an "A" record is present for FQDN which receives a query for the "A" record.

(1) Client 4 requests the IPv4 address ("A" record) for "www.oxΔ.com.6×4.org" to query-requesting DNS server 5 which is specified as the name server.

(2) Query-requesting DNS server 5 queries the IPv4 address for "www.oxΔ.com.6×4.org" to the name server of "6×4.org" domain. Since the name server of "6×4.org" domain is the DNS proxy of the translator, the query reaches DNS proxy 6 of the translator.

(3) DNS proxy 6 of the translator queries the IPv4 address for FQDN "www.oxΔ.com" which is obtained by removing "6×4.org" from "www.oxΔ.com.6×4.org", the queried FQDN, to forwarding destination DNS server 7. Forwarding destination DNS server 7 queries the IPv4 address corresponding to "www.oxΔ.com" to other name servers not shown in the drawing and receives the corresponding IPv4 address.

(4) Forwarding destination DNS server 7 returns the IPv4 address received as the response to the above query to DNS proxy 6 of the translator as the IPv4 address for "www.oxΔ.com".

(5) DNS proxy 6 of the translator returns the received IPv4 address to query-requesting DNS server 5 as the IPv4 address for "www.oxΔ.com.6×4.org".

(6) In a similar manner, query-requesting DNS server 5 returns the received address to client 4.

Figure 5:
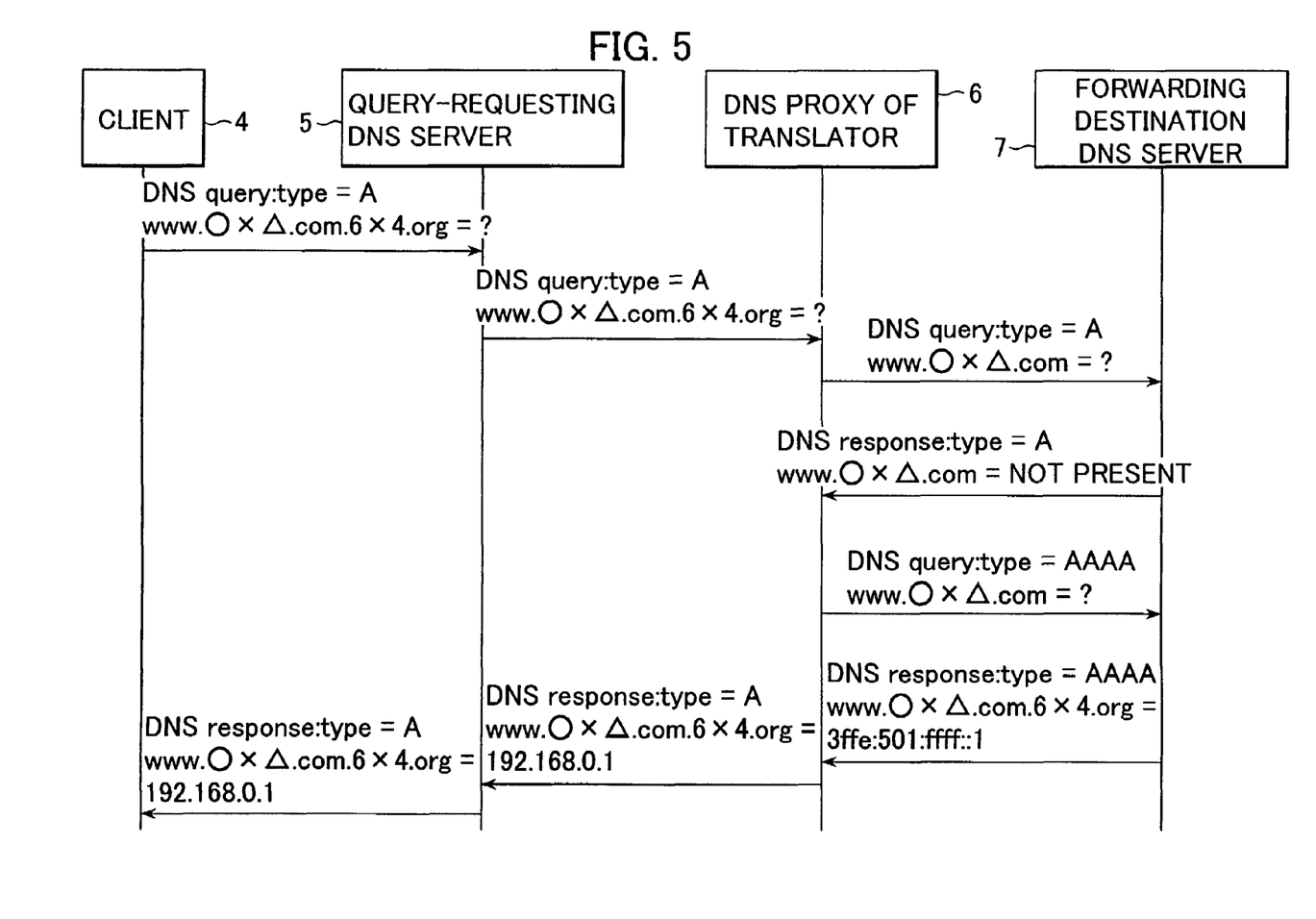
FIG. 5 is an illustrative drawing showing an example of operation in another embodiment of the present invention.

FIG. 5 is an illustrative drawing showing an example of operation in another embodiment of the present invention and shows the operation if the "A" record is not present but the "AAAA" record is present for FQDN which receives a query for the "A" record.

(1) Client 4 requests the IPv4 address ("A" record) for "www.oxΔ.com.6×4.org" to query-requesting DNS server 5 which is specified as the name server.

(2) Query-requesting DNS server 5 queries the IPv4 for "www.oxΔ.com.6×4.org" to the name server of "6×4.org" domain. Since the name server of "6×4.org" domain is the DNS proxy of a translator, the query reaches DNS proxy 6 of the translator.

(3) DNS proxy 6 of the translator queries the IPv4 address for FQDN "www.oxΔ.com" which is obtained by removing "6×4.org" from "www.oxΔ.com.6×4.org", the queried FQDN, to forwarding destination DNS server 7.

(4) Forwarding destination DNS server 7 queries the IPv4 address corresponding to "www.oxΔ.com" to other name servers not shown in the drawing but receives a response that the corresponding IPv4 address is not present and notifies DNS proxy 6 of the translator of the response.

(5) DNS proxy 6 of the translator queries the IPv6 address ("AAAA" record) corresponding to "www.oxΔ.com" to forwarding destination DNS server 7.

(6) Forwarding destination DNS server 7 queries the IPv6 address corresponding to "www.oxΔ.com" to other name servers not shown in the drawing and obtains the corresponding IPv6 address, then notifies DNS proxy 6 of the translator of that address.

(7) DNS proxy 6 of the translator executes mapping of one of the IPv4 addresses prepared for mapping to the IPv6 address to the received IPv6 address, and returns that address to query-requesting DNS server 5 as the IPv4 address corresponding to "www.oxΔ.com.6×4.org".

(8) Query-requesting DNS server 5 returns the address received from DNS proxy 6 of the translator to client 4 as the IPv4 address corresponding to "www.oxΔ.com.6×4.org".

Figure 6:
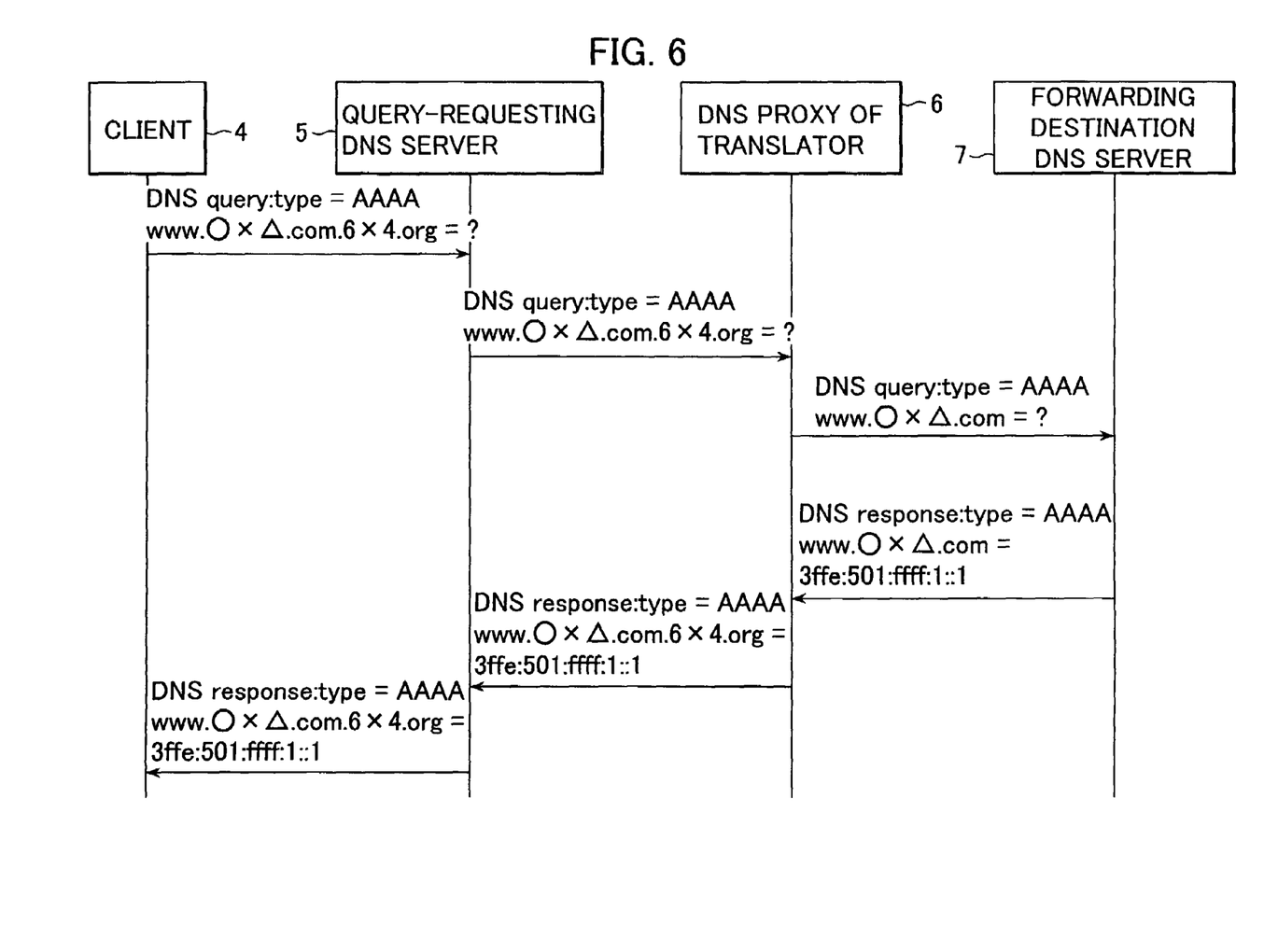
FIG. 6 is an illustrative drawing showing an example of operation in yet another embodiment of the present invention.

FIG. 6 is also an illustrative drawing showing an example of operation in yet another embodiment of the present invention and shows the operation if the "AAAA" record is present for FQDN which receives a query for the "AAAA" record.

(1) Client 4 requests the IPv6 address ("AAAA" record) for "www.oxΔ.com.6×4.org" to query-requesting DNS server 5 which is specified as the name server.

(2) Query-requesting DNS server 5 queries the IPv6 address for "www.oxΔ.com.6×4.org" to the name server of "6×4.org" domain. Since the name server of "6×4.org" domain is the DNS proxy 6 of a translator, the query reaches DNS proxy 6 of the translator.

(3) DNS proxy 6 of the translator queries the IPv6 address for FQDN "www.oxΔ.com" which is obtained by removing "6×4.org" from "www.oxΔ.com.6×4.org", the queried FQDN, to forwarding destination DNS server 7. Forwarding destination DNS server 7 queries the IPv6 address corresponding to "www.oxΔ.com" to other name servers not shown in the drawing and receives the corresponding IPv6 address.

(4) Forwarding destination DNS server 7 returns the received IPv6 address to DNS proxy 6 of the translator as the IPv6 address for "www.oxΔ.com".

(5) DNS proxy 6 of the translator returns the received IPv6 address to query-requesting DNS server 5 as the IPv6 address for "www.oxΔ.com.6×4.org".

(6) In a similar manner, query-requesting DNS server 5 returns the received address to client 4.

Figure 7:
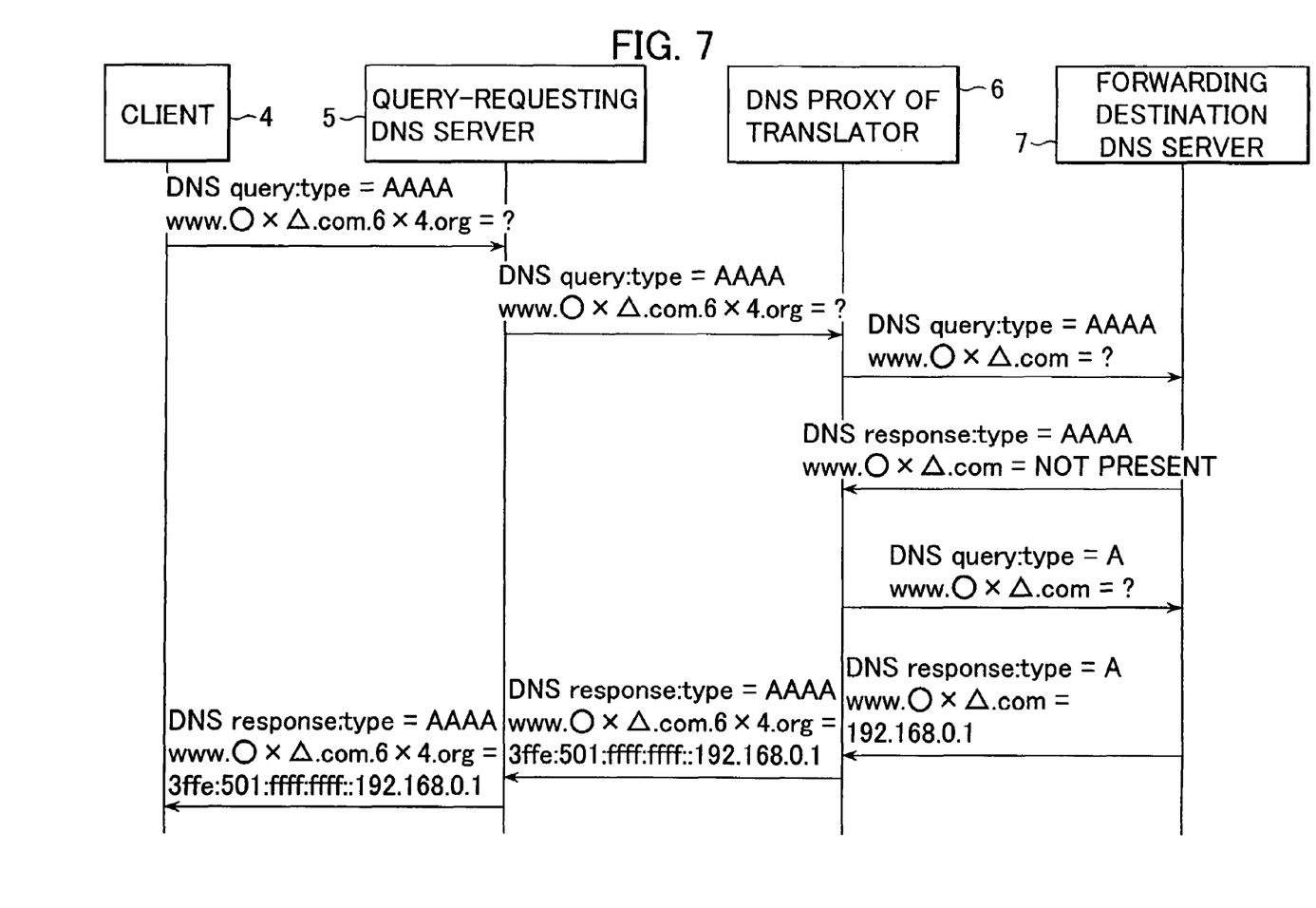
FIG. 7 is an illustrative drawing showing an example of operation in yet another embodiment of the present invention.

FIG. 7 is also an illustrative drawing showing an example of operation in yet another embodiment of the present invention and shows the operation if the "AAAA" record is not present but the "A" record is present for FQDN which receives a query for the "AAAA" record.

(1) Client 4 requests the IPv6 address ("AAAA" record) for "www.oxΔ.com.6×4.org" to query-requesting DNS server 5 which is specified as the name server.

(2) Query-requesting DNS server 5 queries the IPv6 address for "www.oxΔ.com.6×4.org" to the name server of "6×4.org" domain. Since the name server of "6×4.org" domain is DNS proxy 6 of a translator, the query reaches DNS proxy 6 of the translator.

(3) DNS proxy 6 of the translator queries the IPv6 address for FQDN "www.oxΔ.com" which is obtained by removing "6×4.org" from "www.oxΔ.com.6×4.org", the queried FQDN, to forwarding destination DNS server 7.

(4) Forwarding destination DNS server 7 queries the IPv6 address corresponding to "www.oxΔ.com" to other name servers not shown in the drawing but receives a response that the corresponding IPv6 address is not present and notifies DNS proxy 6 of the translator of this response.

(5) DNS proxy 6 of the translator requests the IPv4 address ("A" record) corresponding to "www.oxΔ.com" to forwarding destination DNS server 7.

(6) Forwarding destination DNS server 7 queries the IPv4 address corresponding to "www.oxΔ.com" to other name servers not shown in the drawing and obtains the corresponding IPv4 address, then notifies DNS proxy 6 of the translator of that address.

(7) DNS proxy 6 of the translator generates an IPv6 address with an IPv6 Dummy Prefix prepared for mapping to the IPv6 address in the upper 64 bits and having the IPv4 address in the lower 32 bits, and returns that address to query-requesting DNS server 5 as the IPv6 address corresponding to "www.oxΔ.com.6×4.org".

(8) Query-requesting DNS server 5 returns the received address to client 4 as the IPv6 address corresponding to "www.oxΔ.com.6×4.org".

Figure 8:
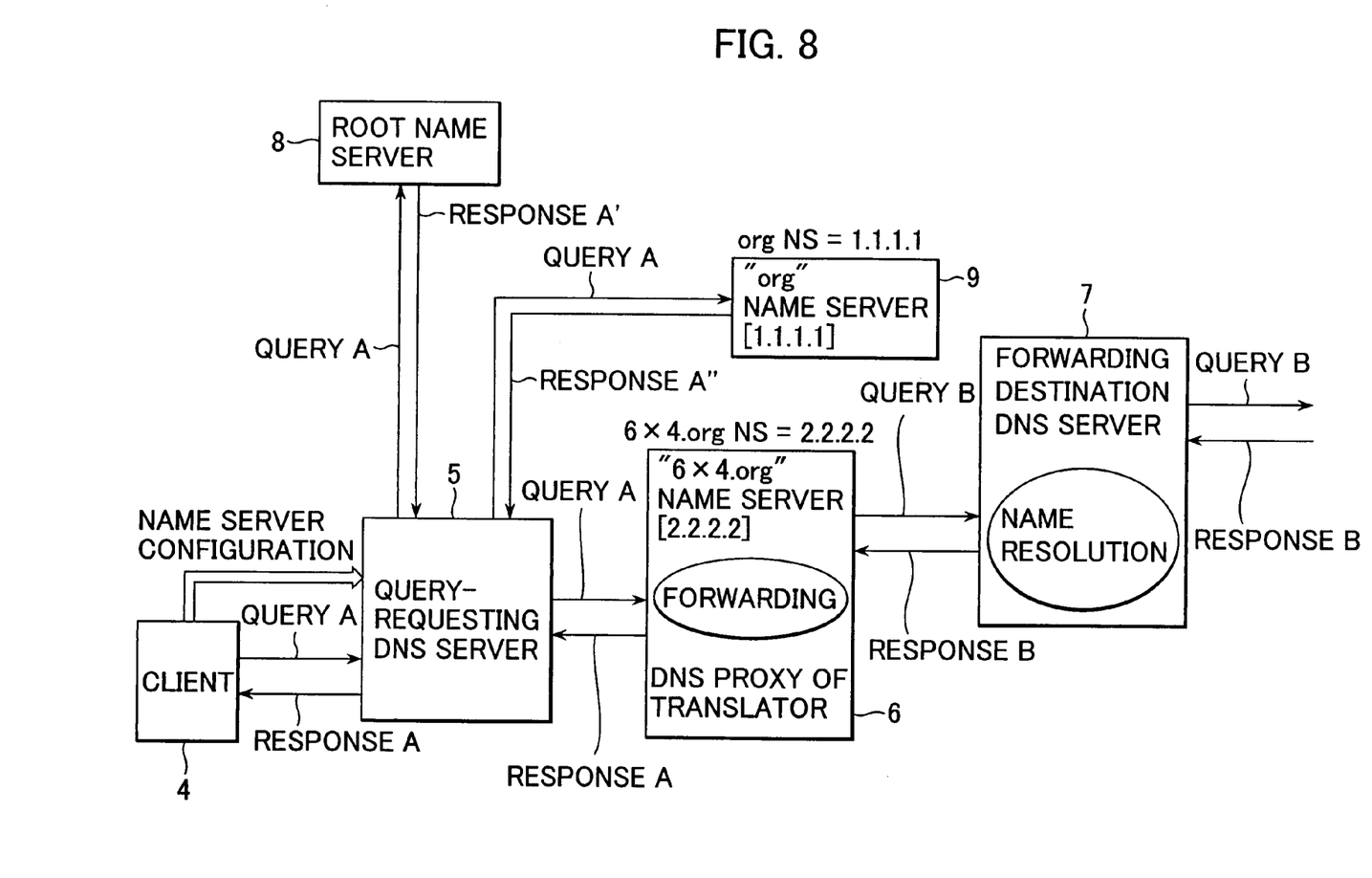
FIG. 8 is a function block diagram illustrating the operation for FIG. 4.

FIG. 8 is a function block diagram illustrating the typical operation if the "A" record is present for FQDN which receives a query for the "A" record shown in FIG. 4, and the contents of each query and response are as shown below.

Query A □ [Query for "A" record for "www.oxΔ.com.6×4.org"]
Query B □ [Query for "A" record for "www.oxΔ.com"]
Response A □ ["A" record for "www.oxΔ.com.6×4.org"]
Response A' □ [NS record (name server) for "org"]
Response A" □ [NS record (name server) for "6×4.org"]
Response B □ ["A" record for "www.oxΔ.com"]

Each exchange of query and response in FIG. 8 is carried out as described below.

(1) Client 4 executes query A for "A" record for "www.oxΔ.com.6×4.org" to query-requesting DNS server 5.

(2) Query-requesting DNS server 5 sends query A to root name server 8.

(3) Root name server 8 sends response A' corresponding to NS record for "org" to query-requesting DNS server 5.

(4) Query-requesting DNS server 5 sends query A to name server for "org" 9.

(5) Name server for "org" 9 sends response A" corresponding to NS record for "6×4.org" to query-requesting DNS server 5.

(6) Query-requesting DNS server 5 sends query A to DNS proxy 6 of the translator.

(7) DNS proxy 6 of the translator sends query B for "A" record for "www.oxΔ.com" to forwarding destination DNS server 7.

(8) Forwarding destination DNS server 7 queries "A" record for "www.oxΔ.com" to other name servers not shown in the drawing.

(9) Forwarding destination DNS server 7 receives response B corresponding to "A" record for "www.oxΔ.com" as the response to the above-described query.

(10) Forwarding destination DNS server 7 sends response B corresponding to "A" record for "www.oxΔ.com" to DNS proxy 6 of the translator.

(11) DNS proxy 6 of the translator sends response A corresponding to the query for "A" record for "www.oxΔ.com.6×4.org" to query-requesting DNS server 5.

(12) Query-requesting DNS server 5 sends response A to client 4.

Figure 9:
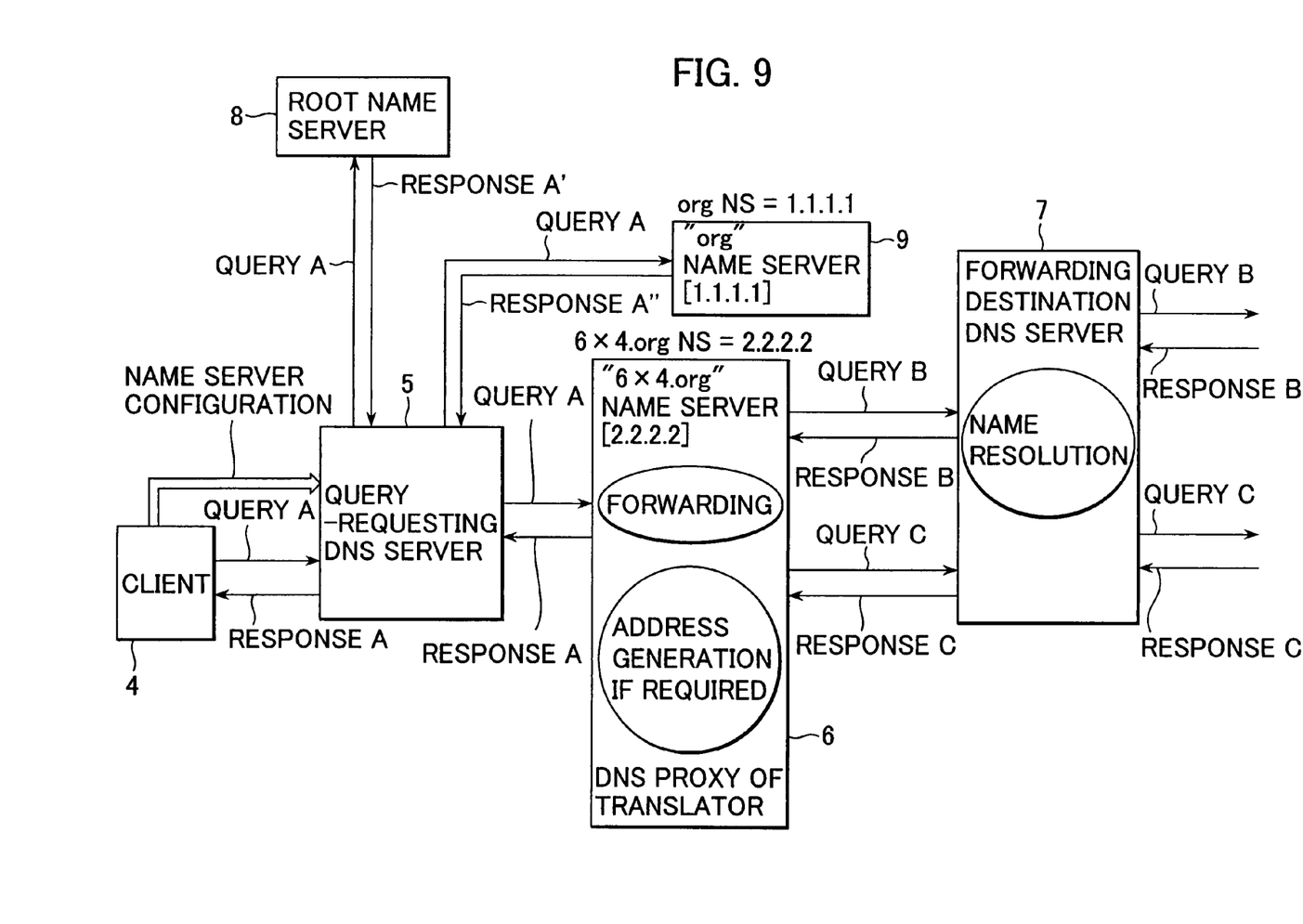
FIG. 9 is a function block diagram illustrating the operation for FIG. 5.

FIG. 9 is a function block diagram illustrating the typical operation, if the "A" record is not present but the "AAAA" record is present for FQDN which receives a query for the "A" record already shown in FIG. 5, and the contents of each query and response are as shown below.

Query A □ [Query for "A" record for "www.oxΔ.com.6×4.org"]
Query B □ [Query for "A" record for "www.oxΔ.com"]
Query C □ [Query for "AAAA" record for "www.oxΔ.com"]
Response A □ ["A" record for "www.oxΔ.com.6×4.org"]
Response A' □ [NS record (name server) for "org"]
Response A" □ [NS record (name server) for "6×4.org"]
Response B □ ["A" record (not present) for "www.oxΔ.com"]
Response C □ ["AAAA" record for "www.oxΔ.com"]

Each exchange of query and response in FIG. 9 is carried out as described below.

(1) Client 4 executes query A for "A" record for "www.oxΔ.com.6×4.org" to query-requesting DNS server 5.

(2) Query-requesting DNS server 5 sends query A to root name server 8.

(3) Root name server 8 sends response A' corresponding to NS record for "org" to query-requesting DNS server 5.

(4) Query-requesting DNS server 5 sends query A to name server for "org" 9.

(5) Name server for "org" 9 sends response A" corresponding to NS record for "6×4.org" to query-requesting DNS server 5.

(6) Query-requesting DNS server 5 sends query A to DNS proxy 6 of the translator.

(7) DNS proxy 6 of the translator sends query B for A record for "www.oxΔ.com" to forwarding destination DNS server 7.

(8) Forwarding destination DNS server 7 queries "A" record for "www.oxΔ.com" to other name servers not shown in the drawing.

(9) Forwarding destination DNS server 7 receives response B that "A" record for "www.oxΔ.com" is not present.

(10) Forwarding destination DNS server 7 sends response B that "A" record for "www.oxΔ.com" is not present to DNS proxy 6 of the translator.

(11) DNS proxy 6 of the translator sends query C for "AAAA" record for "www.oxΔ.com" to forwarding destination DNS server 7.

(12) Forwarding destination DNS server 7 queries "AAAA" record for "www.oxΔ.com" to other name servers not shown in the drawing.

(13) Forwarding destination DNS server 7 receives response C for "AAAA" record for "www.oxΔ.com".

(14) Forwarding destination DNS server 7 sends response C corresponding to the query for "AAAA" record for "www.o×Δ.com" to DNS proxy 6 of the translator.

(15) DNS proxy 6 of the translator sends response A corresponding to the query for "A" record for "www.o×Δ.com.6×4.org" to query-requesting DNS server 5.

(16) Query-requesting DNS server 5 sends response A to client 4.

Figure 10:
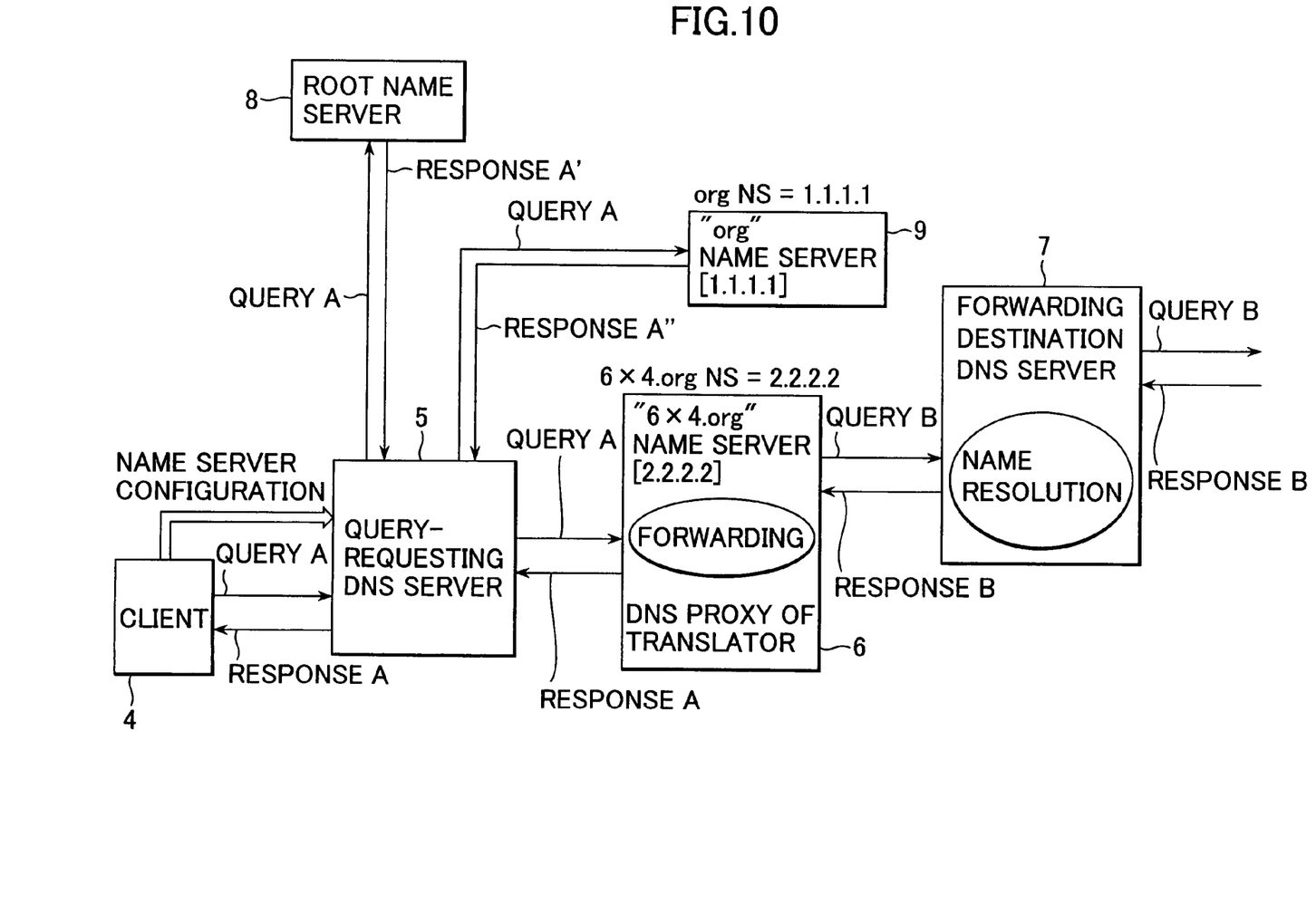
FIG. 10 is a function block diagram illustrating the operation for FIG. 6.

FIG. 10 is a function block diagram illustrating the typical operation if the "AAAA" record is present for FQDN which receives a query for "AAAA" record shown in FIG. 6, and the contents of each query and response are as shown below.

Query A □ [Query for "AAAA" record for "www.o×Δ.com.6×4.org"]

Query B □ [Query for "AAAA" record for "www.o×Δ.com"]

Response A □ ["AAAA" record for "www.o×Δ.com.6×4.org"]

Response A' □ [NS record (name server) for "org"]

Response A" □ [NS record (name server) for "6×4.org"]

Response B □ ["AAAA" record for "www.o×Δ.com"]

Each exchange of query and response in FIG. 10 is carried out as described below.

(1) Client 4 executes query A for "AAAA" record for "www.o×Δ.com.6×4.org" to query-requesting DNS server 5.

(2) Query-requesting DNS server 5 sends query A to root name server 8.

(3) Root name server 8 sends response A' corresponding to NS record for "org" to query-requesting DNS server 5.

(4) Query-requesting DNS server 5 sends query A to name server for "org" 9.

(5) Name server for "org" 9 sends response A" corresponding to NS record for "6×4.org" to query-requesting DNS server 5.

(6) Query-requesting DNS server 5 sends query A to DNS proxy 6 of the translator.

(7) DNS proxy 6 of the translator sends query B for "AAAA" record for "www.o×Δ.com" to forwarding destination DNS server 7.

(8) Forwarding destination DNS server 7 queries "AAAA" record for "www.o×Δ.com" to other name servers not shown in the drawing.

(9) Forwarding destination DNS server 7 receives response B corresponding to "AAAA" record for "www.o×Δ.com".

(10) Forwarding destination DNS server 7 sends response B corresponding to "AAAA" record for "www.o×Δ.com" to DNS proxy 6 of the translator.

(11) DNS proxy 6 of the translator sends response A corresponding to the query for "AAAA" record for "www.o×Δ.com.6×4.org" to query-requesting DNS server 5.

(12) Query-requesting DNS server 5 sends response A to client 4.

Figure 11:
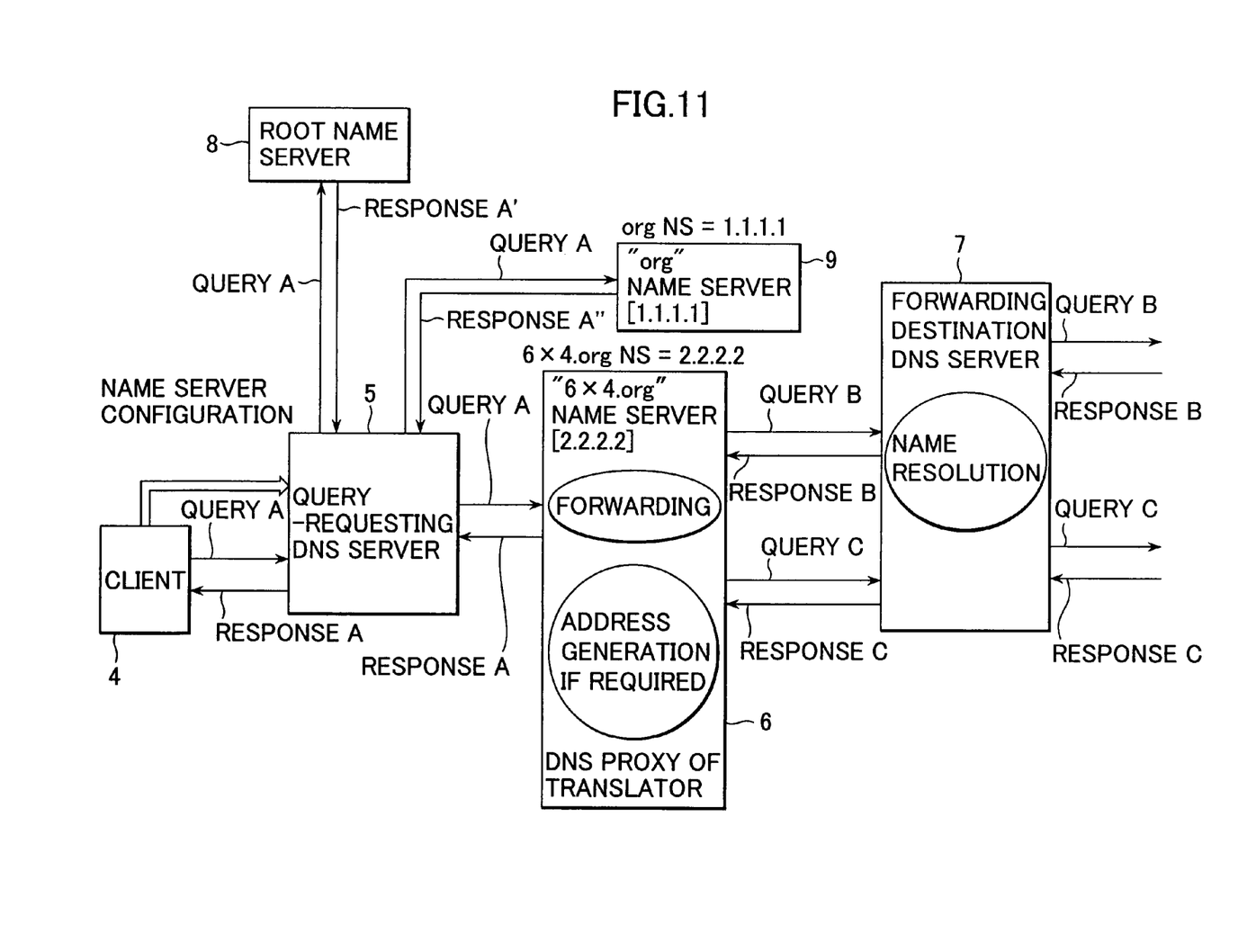
FIG. 11 is a function block diagram illustrating the operation for FIG. 7.

FIG. 11 is an illustrative drawing showing an example of operation in yet another embodiment of the present invention and shows the operation if the "AAAA" record is not present but the "A" record is present for FQDN which receives a query for the AAAA record shown in FIG. 7, and the contents of each query and response are as shown below.

Query A □ [Query for "AAAA" record for "www.o×Δ.com.6×4.org"]

Query B □ [Query for "AAAA" record for "www.o×Δ.com"]

Query C □ [Query for "A" record for "www.o×Δ.com"]

Response A □ ["AAAA" record for "www.o×Δ.com.6×4.org"]

Response A' □ [NS record (name server) for "org"]

Response A" □ [NS record (name server) for "6×4.org"]

Response B □ ["AAAA" record (not present) for "www.o×Δ.com"]

Response C □ ["A" record for "www.o×Δ.com"]

Each exchange of query and response in FIG. 11 is carried out as described below.

(1) Client 4 executes query A for "AAAA" record for "www.o×Δ.com.6×4.org" to query-requesting DNS server 5.

(2) Query-requesting DNS server 5 sends query A to root name server 8.

(3) Root name server 8 sends response A' corresponding to NS record for "org" to query-requesting DNS server 5.

(4) Requesting DNS server 5 sends query A to name server for "org" 9.

(5) Name server for "org" 9 sends response A" corresponding to NS record for "6×4.org" to query-requesting DNS server 5.

(6) Query-requesting DNS server 5 sends query A to DNS proxy 6 of the translator.

(7) DNS proxy 6 of the translator sends query B for "AAAA" record for "www.o×Δ.com" to forwarding destination DNS server 7.

(8) Forwarding destination DNS server 7 queries "AAAA" record for "www.o×Δ.com" to other name servers not shown in the drawing.

(9) Forwarding destination DNS server 7 receives response B that "AAAA" record for "www.o×Δ.com" is not present.

(10) Forwarding destination DNS server 7 sends response B that "AAAA" record for "www.o×Δ.com" is not present to DNS proxy 6 of the translator.

(11) DNS proxy 6 of the translator sends query C for "A" record for "www.o×Δ.com" to forwarding destination DNS server 7.

(12) Forwarding destination DNS server 7 queries "AAAA" record for "www.o×Δ.com" to other name servers not shown in the drawing.

(13) Forwarding destination DNS server 7 receives response C for "A" record for "www.o×Δ.com"

(14) Forwarding destination DNS server 7 sends response C corresponding to the query for "A" record for "www.o×Δ.com" to DNS proxy 6 of the translator.

(15) DNS proxy 6 of the translator sends response A corresponding to the query for "AAAA" record for "www.o×Δ.com.6×4.org" to query-requesting DNS server 5.

(16) Query-requesting DNS server 5 sends response A to client 4.

In the meantime, in the embodiments shown from FIG. 4 to FIG. 11, the DNS proxy of a translator first executes a query for "A" record to forwarding destination DNS server so that "A" record can be returned preferentially if the corresponding "A" record is present for the query for "A" record. However, when the DNS proxy of a translator receives a query for "A" record, it is also possible to cause the DNS proxy of a translator to first execute the query for "AAAA" record, and if the corresponding "AAAA" record is present, to carry out mapping the IPv4 address to the IPv6 address contained in that "AAAA" record, and to return the mapped address preferentially.

Further, operations can be considered such as returning only addresses not subjected to mapping, or returning only addresses subjected to mapping, or returning addresses both subjected to and not subjected to mapping. As shown above, the following operations are considered for the DNS proxy of the translator to which the query for "A" record is sent:

(a) Only "A" records not subjected to mapping are returned.

(b) Only "A" records subjected to mapping to the "AAAA" record are returned.

(c) If the corresponding "A" record is present for the FQDN queried, the "A" record is returned. If the corresponding "A" record is not present but the corresponding "AAAA" record is present, an IPv4 address is subjected to mapping to the IPv6 address in the "AAAA" record and that IPv4 address is returned as the "A" record.

(d) If the corresponding "AAAA" record is present for the FQDN queried, an IPv4 address is subjected to mapping to the IPv6 address in the "AAAA" record and that IPv4 address is returned as the "A" record. If the corresponding "AAAA" record is not present but the corresponding "A" record is present, the "A" address is returned.

(e) If the corresponding "A" record is present for the FQDN queried, the "A" record is returned. If the corresponding "AAAA" record is present, the IPv4 address subjected to mapping to the IPv6 address in the "AAAA" record is returned as the "A" record. If both the returned "A" and the mapped "AAAA" records are present, both records are returned.

Similarly, the following operations are considered for the DNS proxy of the translator to which the query for "AAAA" record is sent:

(a) Only "AAAA" records not subjected to mapping are returned.

(b) Only "AAAA" records subjected to mapping to the "A" record are returned.

(c) If the corresponding "AAAA" record is present for the FQDN queried, the "AAAA" record is returned. If the corresponding "AAAA" record is not present but the corresponding "A" record is present, an IPv6 address is subjected to mapping to the IPv4 address in the "A" record and that mapped IPv6 address is returned as the "AAAA" record.

(d) If the corresponding "A" record is present for the FQDN queried, an IPv6 address is subjected to mapping to the IPv4 address in the "A" record and that mapped IPv6 address is returned as the "AAAA" record. If the corresponding "A" record is not present but the corresponding "AAAA" record is present, the "AAAA" address is returned.

(e) If the corresponding "AAAA" record is present for the FQDN queried, the "AAAA" record is returned. If the corresponding "A" record is present, the IPv6 address subjected to mapping to the IPv4 address in the "A" record is returned as the "AAAA" record. If both the returned "A" and the mapped "AAAA" records are present, both records are returned.

Furthermore, it is possible for the DNS proxy of the translator to select whichever operation is taken for each of the queries for the "A" record and the "AAAA" record. Besides, the operation which a user wants can be specified by entering a defined character string into the FQDN.

(1) If the translated address is expected preferentially, for example, "x.6×4.org" is added.

"www.oxΔ.com.x.6×4.org type=A"

An "A" record of an IPv4 address subjected to mapping to an IPv6 address is returned preferentially.

"www.oxΔ.com.x.6×4.org type=AAAA"

An "AAAA" record of an IPv6 address subjected to mapping to an IPv4 address is returned preferentially.

(2) If the un-translated address is expected preferentially, for example, "n.6×4.org" is added.

"www.oxΔ.com.n.6×4.org type=A"

An "A" record not subjected to mapping is returned preferentially.

"www.oxΔ.com.n.6×4.org type=AAAA"

An "AAAA" record not subjected to mapping is returned preferentially.

(3) If only the translated address is expected, for example, "xo.6×4.org" is added.

"www.oxΔ.com.xo.6×4.org type=A"

Only an "A" record of an IPv4 address subjected to mapping to an IPv6 address is returned.

"www.oxΔ.com.xo.6×4.org type=AAAA"

Only an "AAAA" record of an IPv6 address subjected to mapping to an IPv4 address is returned.

(4) If only the un-translated address is expected, for example, "no.6×4.org" is added.

"www.oxΔ.com.no.6×4.org type=A"

Only an "A" record not subjected to mapping is returned.

"www.oxΔ.com.no.6×4.org type=AAAA"

Only an "AAAA" record not subjected to mapping is returned.

(5) If both the translated address and the un-translated address are expected, for example, "b.6×4.org" is added.

"www.oxΔ.com.b.6×4.org type=A"

Both an "A" record not subjected to mapping and that of an IPv4 address subjected to mapping to an IPv6 address are returned.

"www.oxΔ.com.b.6×4.org type=AAAA"

Both an "AAAA" record not subjected to mapping and that of an IPv6 address subjected to mapping to an IPv4 address are returned.

Further, a client can specify either an address based on IPv6 in FQDN is wanted or an address based on IPv4 is wanted. This enables a client to specify which transport layer protocol to use to communicate with the other party, IPv6 or IPv4.

(6) If the record based on an IPv6 address is expected preferentially, for example, "6.6×4.org" is added.

"www.oxΔ.com.6.6×4.org type=A"

An "A" record of an IPv4 address subjected to mapping to an IPv6 address is returned preferentially.

"www.oxΔ.com.6.6×4.org type=AAAA"

An "AAAA" record not subjected to mapping is returned preferentially.

(7) If the record based on an IPv4 address is expected preferentially, for example, "4.6×4.org" is added.

"www.oxΔ.com.4.6×4.org type=A"

An "A" record not subjected to mapping is returned preferentially.

"www.oxΔ.com.4.6×4.org type=AAAA"

An "AAAA" record of an IPv6 address subjected to mapping to an IPv4 address is returned preferentially.

(8) If only the record based on an IPv6 address is expected, for example, "6o.6×4.org" is added.

"www.oxΔ.com.6o.6×4.org type=A"

Only an "A" record of an IPv4 address subjected to mapping to an IPv6 address is returned.

"www.oxΔ.com.6o.6×4.org type=AAAA"

Only an "AAAA" record not subjected to mapping is returned.

(9) If only the record based on an IPv4 address is expected, for example, "4o.6×4.org" is added.

"www.oxΔ.com.4o.6×4.org type=A"

Only an "A" record not subjected to mapping is returned.

"www.oxΔ.com.4o.6×4.org type=AAAA"

Only an "AAAA" record of an IPv6 address subjected to mapping to an IPv4 address is returned.

What is claimed is:

1. A method of configuring Ipv6/Ipv4 translator system, comprising:

requesting of an address by a client for a DNS query having a dedicated domain to a query-requesting DNS server which is specified as a name server;

instructing the Query-requesting DNS server to query the address for the DNS query to the name server of the dedicated domain wherein since the name server of the dedicated domain being the DNS proxy of the IPv6/IPv4 translator, the query reaches a DNS proxy of the IPv6/IPv4 translator;

instructing the DNS proxy of the IPv6/IPv4 translator to query the address for a FQDN which is obtained by removing the dedicated domain from the DNS query wherein the queried FQDN is forwarded to a forwarding destination DNS server;

instructing the forwarding destination DNS server to query the address corresponding to the FQDN to other name servers and to receive a corresponding address;

instructing the forwarding destination DNS server to return the address received as the response to the above query to the DNS proxy of the IPv6/IPv4 translator as the address for the FQDN;

instructing the DNS proxy of the IPv6/IPv4 translator to return the received address to the query-requesting DNS server as the address for the DNS query having the dedicated domain; and instructing the query-requesting DNS server to return the received address to the client, said client specifies at least either a IPv6-based IPv4 or IPv6 address or IPv4-based IPv4 or IPv6 address as a desired address to be returned by entering a defined character string corresponding to operation to be specified for an IPv4(IPv6) address query, wherein:

if the corresponding IPv4 address is not found, said forwarding destination DNS server notifies the DNS proxy of the IPv6/IPv4 translator that the IPv4 address corresponding to the FQDN is not present, then the DNS proxy of the IPv6/IPv4 translator queries the forwarding destination DNS server which then obtains corresponding IPv6 address and notifies the DNS proxy of the IPv6/IPv4 translator, wherein the DNS proxy of the IPv6/IPv4 translator maps one of the IPv4 addresses of the Ipv6/IPv4 translator to the received IPv6 address and returns the mapped address to the query-requesting DNS server as the IPv4 address corresponding to the DNS query having the dedicated domain, and the query-requesting DNS server returns this mapped address to the client.

2. The method of configuring IPv6/IPv4 translator system according to claim 1, wherein:

if the corresponding IPv6 address is not found, said forwarding destination DNS server notifies the DNS proxy of the IPv6/IPv4 translator that the IPv6 address corresponding to the FQDN is not present, then the DNS proxy of the IPv6/IPv4 translator queries the forwarding destination DNS server which then obtains corresponding IPv4 address and notifies the DNS proxy of the IPv6/IPv4 translator, wherein the DNS proxy of the IPv6/IPv4 translator generates an IPv6 address based on a unique IPv6 prefix that is preset in the IPv6/IPv4 translator so as to map to the received Ipv4 address to the IPv6 address corresponding to the DNS query having the dedicated domain, and the query-requesting DNS server returns this mapped address to the client.

3. The method of configuring IPv6/IPv4 translator system according to claim 1, wherein when the DNS query is from an IPv6 client, the DNS proxy of the IPv6/IPv4translator generates an IPv6 address based on a unique IPv6 prefix that is preset in the IPv6/IPv4 translator so as to map to the received IPv4 address to the IPv6 address corresponding to the DNS query having the dedicated domain, and a query-requesting DNS server returning this mapped address to the client.

4. The method of configuring IPv6/IPv4 translator system according to claim 1, wherein when the DNS proxy of the IPv6/IPv4 translator maps one of the IPv4 addresses of the Ipv6/IPv4 translator to the received IPv6 address and returns the mapped address to the query-requesting DNS server as the IPv4 address corresponding to the DNS query having the dedicated domain, and the query-requesting DNS server returns this mapped address to the client.

* * * * *